United States Patent
Gummadi et al.

(10) Patent No.: US 11,619,702 B2
(45) Date of Patent: Apr. 4, 2023

(54) METHOD AND APPARATUS FOR ENHANCED POSITIONING IN 5G-NR USING DAOD AND DAOA

(71) Applicant: QUALCOMM Incorporated, San Diego, CA (US)

(72) Inventors: Bapineedu Chowdary Gummadi, Hyderabad (IN); Stephen William Edge, Escondido, CA (US); Hem Agnihotri, Benares (IN)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 16/992,847

(22) Filed: Aug. 13, 2020

(65) Prior Publication Data

US 2021/0048502 A1    Feb. 18, 2021

(30) Foreign Application Priority Data

Aug. 14, 2019    (IN) .............................. 201941032874

(51) Int. Cl.
  *G01S 3/72*    (2006.01)
  *G01S 1/04*    (2006.01)
  (Continued)

(52) U.S. Cl.
  CPC ................ *G01S 3/72* (2013.01); *G01S 1/042* (2013.01); *G01S 5/0218* (2020.05);
  (Continued)

(58) Field of Classification Search
  CPC ... G01S 1/042; G01S 1/08; G01S 3/72; G01S 5/0236; G01S 5/01; G01S 5/0218; G01S 5/10; H04B 7/0408; H04B 7/043
  See application file for complete search history.

(56) References Cited

U.S. PATENT DOCUMENTS 10,932,221 B2 *   2/2021   Grossmann ......... H04W 64/003
2019/0146052 A1   5/2019   Chiu et al.
(Continued)

FOREIGN PATENT DOCUMENTS

WO    WO-2018111254 A1 *  6/2018

OTHER PUBLICATIONS

Chen H., et al., "Angular Information-Based NLOS/LOS Identification for Vehicle to Vehicle MIMO System", 2019 IEEE International Conference on Communications Workshops (ICC Workshops), IEEE, May 20, 2019 (May 20, 2019), pp. 1-6, XP033575350, DOI: 10.1109/ICCW.2019.8756726 [retrieved on Jul. 8, 2019] I I LOS/NLOS Identification.

(Continued)

*Primary Examiner* — Cassi J Galt
(74) *Attorney, Agent, or Firm* — Weaver Austin Villeneuve & Sampson LLP

(57) ABSTRACT

The angle of departure (AOD) of directed beams, e.g., beamformed beams, transmitted by one or more base stations, such as a gNB, and the angle of arrival (AOA) of the directed beams received by a UE may be used to improve positioning accuracy by identifying Line Of Sight (LOS) beams and multi-path beams. The differential AOA (DAOA) of a directed beam pair may compared to the differential AOD (DAOD) of the directed beam pair. Matching DAOA and DAOD may be used as an indication that the directed beams in the beam pair are LOS with the UE, whereas a mis-match indicates one or both of the directed beams are multi-path. The location of the UE may be estimated using the measurement information, e.g., AOA, RTT, RSTD, etc., obtained from LOS directed beams.

28 Claims, 9 Drawing Sheets

(51) Int. Cl.
      *H04B 7/04*          (2017.01)
      *G01S 5/10*           (2006.01)
      *G01S 5/02*           (2010.01)
      *H04B 7/0426*      (2017.01)
      *H04B 7/0408*      (2017.01)

(52) U.S. Cl.
      CPC .............. *G01S 5/0236* (2013.01); *G01S 5/10* (2013.01); *H04B 7/043* (2013.01); *H04B 7/0408* (2013.01)

(56) References Cited

U.S. PATENT DOCUMENTS

2021/0239783 A1\*   8/2021   Calcev .................. G01S 5/0215
2022/0229143 A1\*   7/2022   Dwivedi ............... G01S 5/0218

OTHER PUBLICATIONS

International Search Report and Written Opinion—PCT/US2020/046426—ISA/EPO—dated Nov. 17, 2020.

\* cited by examiner

METHOD AND APPARATUS FOR ENHANCED POSITIONING IN 5G-NR USING DAOD AND DAOA

CLAIM OF PRIORITY UNDER 35 U.S.C. § 119

This application claims under 35 USC § 119 the benefit of and priority to India Provisional Application No. 201941032874, filed Aug. 14, 2019, and entitled "EFFICIENT/ENHANCED POSITIONING IN 5G-NR USING DAOD AND DAOA," which is assigned to the assignee hereof and is incorporated herein by reference in its entirety.

BACKGROUND

The present disclosure relates generally to communication, and more specifically to techniques for supporting location services for user equipments (UEs) served by a Fifth Generation (5G) wireless network.

Relevant Background

It is often desirable to know the location of a user equipment (UE) such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

To assist in location determination, base stations may broadcast Positioning Reference Signals (PRS), which are used by UEs for downlink (DL) measurements, such as Reference Signal Time Difference (RSTD), Round-Trip-Time (RTT) which is also referred to as round trip signal propagation time, an Angle of Arrival (AOA), an Angle of Departure (AOD), a Reference Signal Received Power (RSRP), and a Reference Signal Received Quality (RSRQ). For example, a UE may measure time differences in received PRS signals from a plurality of base stations for Observed Time Difference of Arrival (OTDOA) based positioning. Because the positions of the base stations are known, the observed time differences may be used to calculate the location of the UE. However, problems can arise when signals that are transmitted by a base station (BS) and received and measured by a UE do not arrive at the UE via a Line Of Sight (LOS) path but instead are reflected, refracted or otherwise deflected by one or more intervening objects and arrive at the UE via two or more straight line paths, known as "multipath". Measurements of multipath signals can significantly impair location accuracy. Solutions to eliminate or mitigate this are therefore desirable.

SUMMARY

The angle of departure (AOD) of directed beams, e.g., beamformed beams, transmitted by one or more base stations, such as a gNB, and the angle of arrival (AOA) of the directed beams received by a UE may be used to improve positioning accuracy by identifying Line Of Sight (LOS) beams and multi-path beams. The differential AOA (DAOA) of a directed beam pair may compared to the differential AOD (DAOD) of the directed beam pair. Matching DAOA and DAOD may be used as an indication that the directed beams in the beam pair are LOS with the UE, whereas a mis-match indicates one or both of the directed beams are multi-path. The location of the UE may be estimated using the measurement information, e.g., AOA, RTT, RSTD, etc., obtained from LOS directed beams.

In one implementation, a method for supporting location services for a user equipment (UE) includes obtaining a differential Angle of Arrival (DAOA) for a pair of directed beams transmitted by at least one base station; obtaining a differential Angle of Departure (DAOD) for the pair of directed beams transmitted by the at least one base station; comparing the DAOA to the DAOD to determine if the pair of directed beams are both Line Of Sight (LOS); and determining a location estimate for the UE using at least one of the directed beams in the pair of directed beams when the pair of directed beams are both LOS.

In one implementation, an entity for supporting location services for a user equipment (UE), includes an external interface for receiving and sending messages in a network; memory configured to store instructions; and at least one processor coupled to the external interface and the memory, the at least one processor configured by the instructions stored in the memory to: obtain a differential Angle of Arrival (DAOA) for a pair of directed beams transmitted by at least one base station; obtain a differential Angle of Departure (DAOD) for the pair of directed beams transmitted by the at least one base station; compare the DAOA to the DAOD to determine if each directed beam in the pair of directed beams is Line Of Sight (LOS); and determine a location estimate for the UE using at least one of the directed beams in the pair of directed beams when each directed beam in the pair of directed beams is LOS.

In one implementation, an entity for supporting location services for a user equipment (UE), includes means for obtaining a differential Angle of Arrival (DAOA) for a pair of directed beams transmitted by at least one base station; means for obtaining a differential Angle of Departure (DAOD) for the pair of directed beams transmitted by the at least one base station; means for comparing the DAOA to the DAOD to determine if each directed beam in the pair of directed beams is Line Of Sight (LOS); and means for determining a location estimate for the UE using at least one of the directed beams in the pair of directed beams when each directed beam in the pair of directed beams is LOS.

In one implementation, a non-transitory storage medium including program code stored thereon, the program code is operable to configure at least one processor in an entity for supporting location services for a user equipment (UE), includes program code to obtain a differential Angle of Arrival (DAOA) for a pair of directed beams transmitted by at least one base station; program code to obtain a differential Angle of Departure (DAOD) for the pair of directed beams transmitted by the at least one base station; program code to compare the DAOA to the DAOD to determine if each directed beam in the pair of directed beams is Line Of Sight (LOS); and program code to determine a location estimate for the UE using at least one of the directed beams in the pair of directed beams when each directed beam in the pair of directed beams is LOS.

BRIEF DESCRIPTION OF THE DRAWINGS

An understanding of the nature and advantages of various embodiments may be realized by reference to the following figures.

Figure 1:
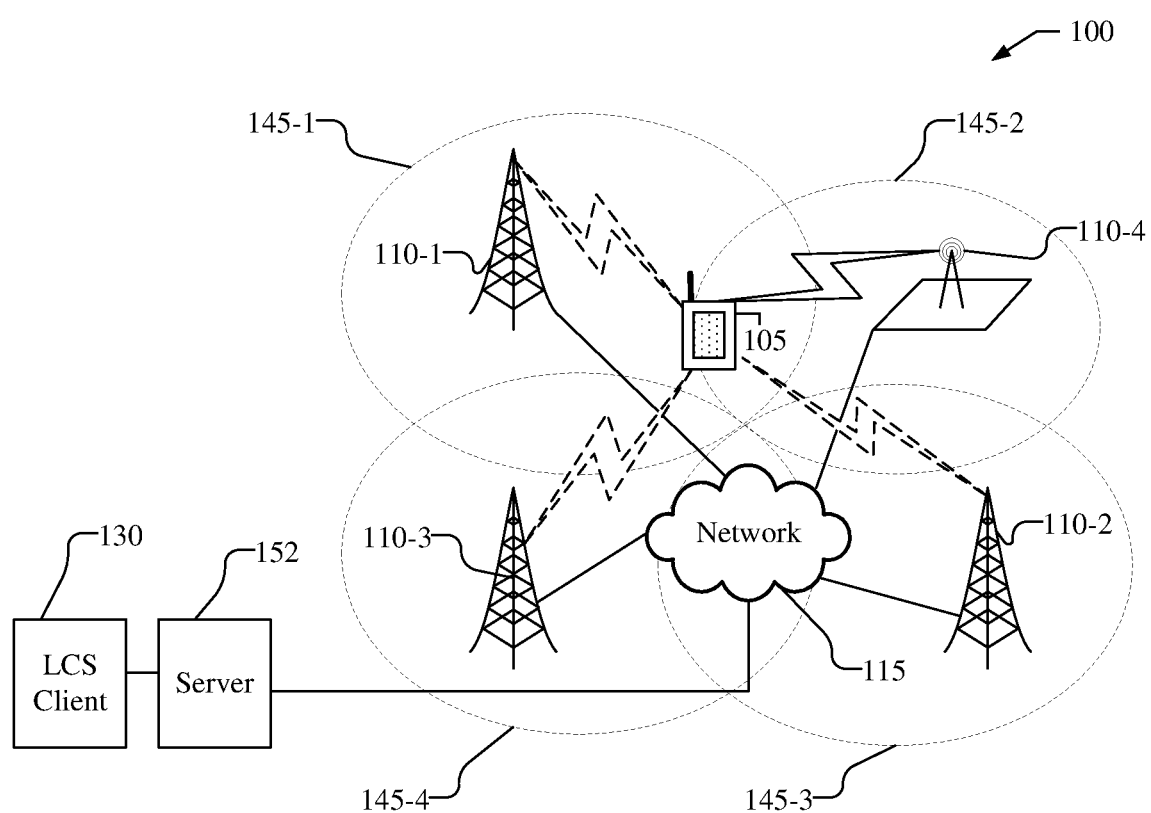
FIG. 1 shows an architecture of a system capable of providing location services to a User Equipment using beamformed PRS transmissions.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. When referring to such an element using only the first number, any instance of the element is to be understood (e.g. elements 110 may refer to elements 110-1, 110-2 and 110-3).

DETAILED DESCRIPTION

Positioning Reference Signals (PRS) are broadcast by base stations and are used by UEs for positioning in Long Term Evolution (LTE) networks, where the UE measures metrics for the received PRS signals, such as the TOA (Time of Arrival), Angle of Arrival (AOA), Round Trip Time (RTT), etc., for different cells and may be reported to a location server in the network. The location server (LS) or the UE may use the measurements for trilateration or triangulation to generate a fix for the position of the UE. PRS signals are typically transmitted at higher power than Cell specific Reference Signals (CRS) to have higher hearability. In LTE networks, PRS is transmitted simultaneously throughout the cell coverage area.

In the Fifth Generation (5G) wireless network, a PRS may not be transmitted simultaneously throughout a cell coverage area. For 5G New Radio (NR), positioning signals (e.g. PRS) may be transmitted directionally, such that a transmission spans a narrow range of angles (e.g. 5 degrees of azimuth) using a "directional beam," using beamforming. Beamforming can increase the range and strength of a signal. Due to high capacity and low range of a base station in NR, e.g., referred to as gNB, beamforming has become mandatory which will help serve more users and increase the range of the users. In beamforming, the direction of transmission of the positioning signal may change with time. For example, a directional beam may be rotated through 120 degrees for a cell sector or 360 degrees for an omnidirectional cell, with the rotation periodically repeated. Moreover, multiple directional beams may be transmitted at the same time in several different directions and the directions of transmission may change with time.

In the current specifications and proposed mechanisms defining PRS specifics for 5G NR, PRS is scheduled on different beams mapped to different physical/geographical directions, i.e., different azimuth angles, which may be generally defined as a horizontal angle measured clockwise (or counter-clockwise) from any fixed reference plane or easily established base direction line. The current methods proposed for positioning in 5G NR are based on, e.g., AOA (Angle of Arrival), AOD (Angle of Arrival), signal strength, signal quality, and TA (Timing Advance). These methods include both Enhanced Cell ID (ECID) and Observed Time Difference Of Arrival (OTDOA) and other positioning techniques. In the current OTDOA specifications of 5G NR, the PRS are assumed to be transmitted along the regular Synchronization Signal (SS) directions or re-use the Synchronization Signal Block (SSB) transmissions for RSTD measurements.

With beamforming, beams are transmitted by the gNB in a directed way and they are received by the UE in a directed way as well. Additionally, directed beams may be transmitted by a gNB for downlink and transmitted by a UE on the uplink. Presently, the AOA or AOD of directed beams are not used for improving positioning accuracy of a location estimate.

In the current disclosure, the use of AOD and the angle of arrival may be used to identify directed beams that are multi-path and beams that are Line Of Sight (LOS), where only the LOS beams are used for location estimation thereby improving positioning accuracy.

FIG. 1 shows an architecture of a system 100 capable of providing location services to UE 105 using beamformed PRS transmissions. The transfer of capabilities, location assistance data, location information, etc. may use messages such as Long Term Evolution (LTE) Positioning Protocol (LPP) or LPP extensions (LPPe) messages or New Radio Position Protocol A (NRPPa) messages between UE 105 and base stations 110 or server 152, which, in some instances, may take the form of a location server, which in an NR network may be a Location Management Function (LMF), or another network entity. Server 152 is referred to herein as a location server 152 or LMF 152 in instances where server 152 corresponds to a location server or LMF, respectively. The transfer of the location information may occur at a rate appropriate to both UE 105 and location server 152. LPP is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

For simplicity, only one UE 105 and location server 152 are shown in FIG. 1. The position of the UE 105 may be determined using PRS transmissions from the base stations 110 using the angle of departure (AOD) at one or more base stations 110 and angle of arrival (AOA) at the UE 105 to improve the positioning accuracy. In general, system 100 may comprise multiple cells indicated by 145-$k$ ($0<k<N_{cells}$, where $N_{cells}$ is the number of cells) with additional networks 115, LCS clients 130, UEs 105, servers 152, base station (antennas) 110, and Space Vehicles (SVs) (not shown). System 100 may further comprise a mix of cells including macrocells such as cells 145-1, 145-3, and 145-4 along with femtocells such as cell 145-2 (which may use a small, low-power base station 110-4), in a manner consistent with embodiments disclosed herein.

UE 105 may be capable of wirelessly communicating with location server 152 through one or more networks 115 that support positioning and location services. For example, location services (LCS) may be performed on behalf of LCS Client 130 that accesses location server 152 and issues a request for the location of UE 105. Location server 152 may then respond to LCS client 130 with a location estimate for UE 105. LCS Client 130 may also be known as a SUPL Agent—e.g. when the location solution used by location server 152 and UE 105 is SUPL. In some embodiments, UE 105 may also include an LCS Client or a SUPL agent that may issue a location request to some positioning capable function within UE 105 and later receive back a location estimate for UE 105. The LCS Client or SUPL Agent within UE 105 may perform location services for the user of UE 105—e.g. provide navigation directions or identify points of interest within the vicinity of UE 105.

As illustrated in FIG. 1, the UE 105 may communicate with location server 152 through network 115 and base stations 110, which may be associated with network 115. UE 105 may receive and measure signals from base stations 110 that are beam formed at specific angles of departure (ACM), which may be used for position determination. For example, UE 105 may receive and measure signals from one or more of base stations 110-1, 110-2, 110-3 and/or 110-4, which may be associated with cells 145-1, 145-2, 145-3 and 145-4, respectively. In some embodiments, base stations 110 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A "beamformed PRS" or "PRS beam" may provide PRS signal coverage over a narrow range of contiguous horizontal angles (also referred to as angles of azimuth) and/or a narrow range of contiguous vertical angles (also referred to as angles of elevation). For example, PRS transmission might be directed through a range of horizontal angles between $\theta$ and $(\theta+\alpha)$ degrees clockwise from North and/or between a range of vertical angles between $\Phi$ and $(\Phi+\beta)$ degrees above (or below) a horizontal plane. Outside these angles, PRS transmission may still be present (e.g. due to imperfect antenna array characteristics) but may have a reduced signal power of at least X dB below the center of the beam (at azimuth $(\theta+0.5\ \alpha)$ and/or elevation $(\Phi+0.5\beta)$). For example, X may be 3, $\alpha$ may be 10 degrees and/or $\beta$ may be 10 degrees. PRS within these angles may be referred to as part of a PRS beam and outside these angles as not part of the PRS beam. A PRS with the center horizontal and/or vertical angles $((\theta+0.5\alpha)$ and/or $(\Phi+0.5\beta))$ respectively) may be referred to as the center PRS.

An AOD may be defined by the horizontal and/or vertical angles for the center PRS. If a UE 105 is able to receive a PRS from each of base stations 110-1, 110-2 and 110-3 with a signal strength indicating the PRS is part of (and not outside of) a PRS beam from each base station, the location of the UE 105 may be obtained by triangulation from the intersection point of the three center PRSs or the intersection area of the three PRS beams. The location may also be obtained from the center PRS or PRS beam for any one base station and an estimate of the distance of UE 105 from this base station, e.g. as obtained from an RTT measurement for the UE 105 and the base station.

Figure 2:
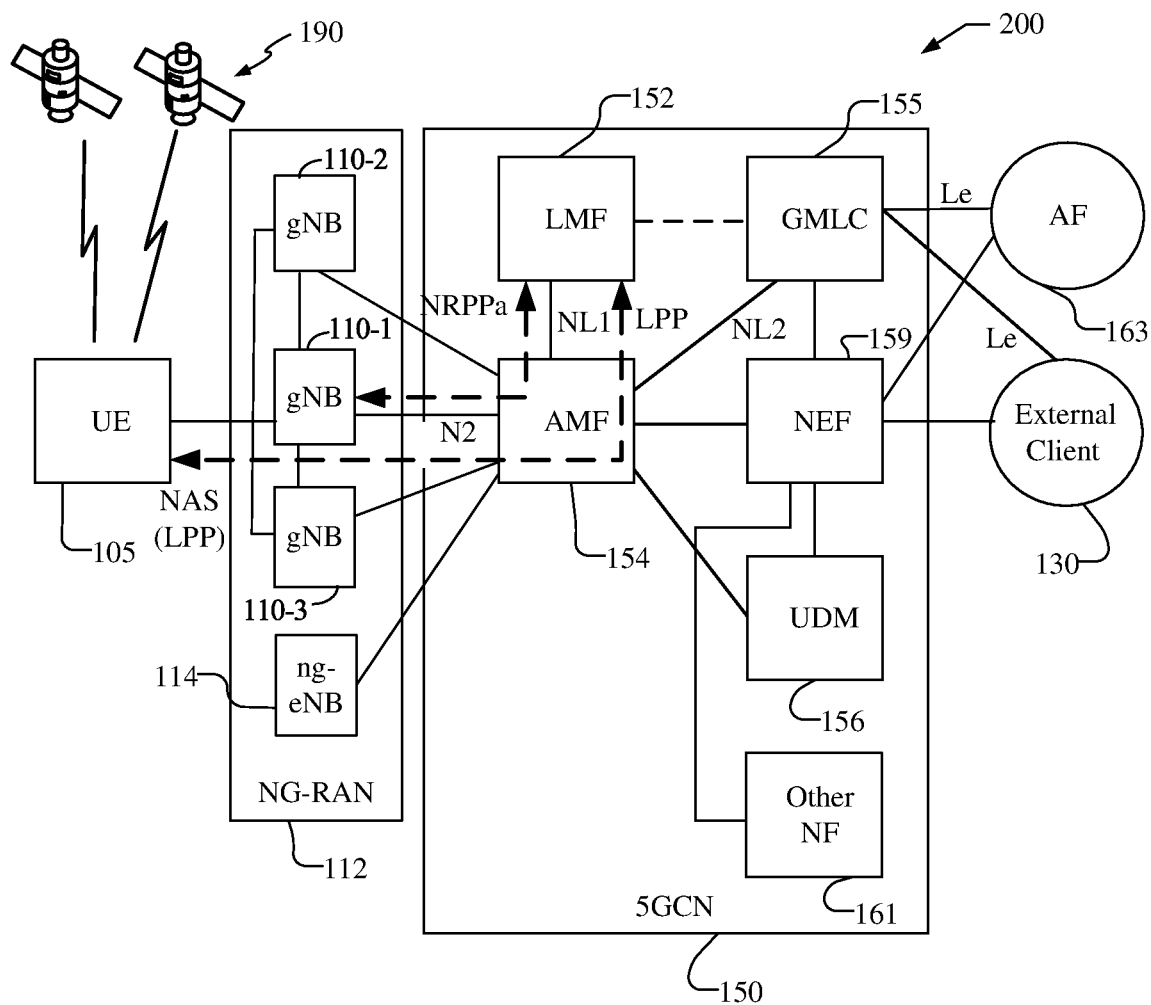
FIG. 2 is a block diagram illustrating a non-roaming reference architecture for UE location determination using beamformed PRS transmissions.

FIG. 2 is a simplified block diagram illustrating a communication system 200 for non-roaming support of UE location using directed beams, e.g., beamformed PRS transmissions from the base stations 110. The non-roaming communication system 200 comprises a UE 105 and components of a Fifth Generation (5G) network comprising a Next Generation Radio Access Network (NG-RAN) 112, which includes base stations sometimes referred to as New Radio (NR) NodeBs (also referred to as gNBs) 110-1, 110-2 and 110-3 (collectively and generically referred to herein as gNBs 110), and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as an Next Generation (NG) Core network (NGC). The communication system 200 may further utilize information from space vehicles (SVs) 190 for a Satellite Positioning System (SPS), such as a Global Navigation Satellite System (GNSS) like GPS, GLONASS, Galileo or Beidou or some other local or regional SPS such as IRNSS, EGNOS or WAAS. Additional components of the communication system 200 are described below. The communication system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 200. Similarly, the communication system 200 may include a larger or smaller number of SVs 190, gNBs 110, external clients 130, and/or other components. The illustrated connections that connect the various components in the communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a RAN, denoted by the term "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 2), with the N3IWF connected to AMF 154.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as Global System for Mobile Communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 2, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, and/or receiving wireless signals from a cellular transceiver, in the NG-RAN 112, such as a gNB 110. A transceiver provides user and control plane protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, a location server (e.g. LMF 152) may comprise an almanac which indicates locations and identities of cellular transceivers and/or local transceivers in a particular region or regions such as a particular venue, and may provide information descriptive of signals transmitted by a cellular base station or AP (e.g., a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS ephemeris information) received from a location server (e.g. LMF 152) or broadcast by a base station (e.g. a gNB 110) in NG-RAN 112 to determine a location for UE 105.

The UE 105 may measure one or more of a Reference Signal Time Difference (RSTD), a Receive-Transmit (Rx-Tx) time difference, an Angle of Arrival (AOA), a Round Trip signal propagation Time (RTT), an Angle of Departure (ADD), a Reference Signal Strength Indication (RSSI), a Reference Signal Received Power (RSRP), a Reference Signal Received Quality (RSRQ). In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 2, pairs of gNBs 110 in NG-RAN 112 may be connected to one another, e.g., directly as shown in FIG. 2 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G NR. In FIG. 2, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 2 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 2 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved NodeBs (eNBs), or other types of base stations or access points. As an example, NG-RAN 112 may include one or more next generation eNBs (ng-eNBs) 114 which provide LTE wireless access to UE 105 and may connect to entities in 5GCN 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105; NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location service requests for the UE 105, e.g., received from the GMLC 155 or from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support one or more GMLC location methods for obtaining a location of a UE 105. With a GMLC location method, GMLC 155 may support a location request for the UE 105 received from an external client 130 or from NEF 159 and may forward such a location request to the LMF 152 via the serving AMF 154 or directly. A location response from the LMF 152 (e.g. containing a location estimate for the UE 105) may be similarly returned to the GMLC 155 via the serving AMF 154 or directly, and the GMLC 155 may then return the location response (e.g., containing the location estimate) to the external client 130 or NEF 159. GMLC 155 may contain subscription information for an external client 130 and may authenticate and authorize a location request for UE 105 from external client 130. GMLC 155 may further initiate a location session for UE 105 by sending a location request for UE 105 to AMF 154 (e.g. which then forwards the request to LMF 152) and may include in the location request an identity for UE 105 and the type of location being requested (e.g. such as a current location or a sequence of periodic or triggered locations).

As further illustrated in FIG. 2, the LMF 152 and the gNBs 110 may communicate using a New Radio Position Protocol A (which may be referred to as NRPPa). NRPPa may be defined in 3GPP Technical Specification (TS) 38.455, with NRPPa messages being transferred between the gNBs 110 and the LMF 152 via the AMF 154. As further illustrated in FIG. 2, LMF 152 and UE 105 may communicate using the LTE Positioning Protocol (LPP) defined in 3GPP TS 36.355, where LPP messages are transferred inside Non-Access Stratum (NAS) transport messages between the UE 105 and the LMF 152 via the AMF 154 and a serving gNB 110-1 for UE 105. For example, LPP messages may be transferred between the LMF 152 and the AMF 154 using a transport protocol (e.g. IP based) or a service based operation (e.g. using the Hypertext Transfer Protocol (HTTP)), and may be transferred between the AMF 154 and the UE 105 using a NAS transport protocol. The LPP protocol may be used to support positioning of UE 105 using UE assisted and/or UE based position methods such as A-GNSS, RTK, WLAN, OTDOA and/or ECID. The NRPPa protocol may be used to support positioning of UE 105 using network based position methods such as ECID (when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA.

With a UE assisted position method, UE 105 may obtain location measurements (e.g. measurements of RSSI, RTT, RSTD, RSRP and/or RSRQ for gNBs 110, ng-eNB 114 or WLAN APs, or measurements of GNSS pseudorange, code phase and/or carrier phase for SVs 190) and may send the measurements to a location server (e.g. LMF 152) for computation of a location estimate for UE 105. With a UE based position method, UE 105 may obtain location measurements (e.g. which may be the same as or similar to location measurements for a UE assisted position method) and may then compute a location of UE 105 (e.g. with the help of assistance data received from a location server such as LMF 152 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GCN 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the AMF 154. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management.

To support services including location services from external clients 130 for Internet of Things (IoT) UEs, a Network Exposure Function (NEF) 159 may be included in 5GCN 150. An NEF may also be referred to as a Service Capability Exposure Function (SCEF), e.g. for a UE 105 with LTE access to an EPC rather than 5G NR radio access to 5GCN 150. The NEF 159 may support secure exposure of capabilities and events concerning 5GCN 150 and UE 105 to an external client 130 or AF 163 and may enable secure provision of information from external client 130 or AF 163 to 5GCN 150. In the context of location services, NEF 159 may function to obtain a current or last known location for a UE 105, may obtain an indication of a change in location for a UE 105, or an indication of when a UE 105 becomes available (or reachable). An external client 130 or external AF 163 may access NEF 159 directly or may access a Services Capability Server (SCS, not shown in FIG. 2), which may access NEF 159 on behalf of external client 130 in order to provide location information to the external client 130 or AF 163 for UE 105 via the SCS. The NEF 159 may be connected to the GMLC 155 to support last known location, current location and/or deferred periodic and triggered location for the UE 105 using a GMLC location method supported by GMLC 155. If desired, the NEF 159 may include, or may be combined with, the GMLC 155 and may then obtain location information for UE 105 directly from LMF 152 (e.g. may be connected to LMF 152). NEF 159 may also be connected to AMF 154 and/or to UDM 156 to enable NEF 159 to obtain a location for UE 105 from the AMF 154 using the AMF location method referred to previously.

Figure 3:
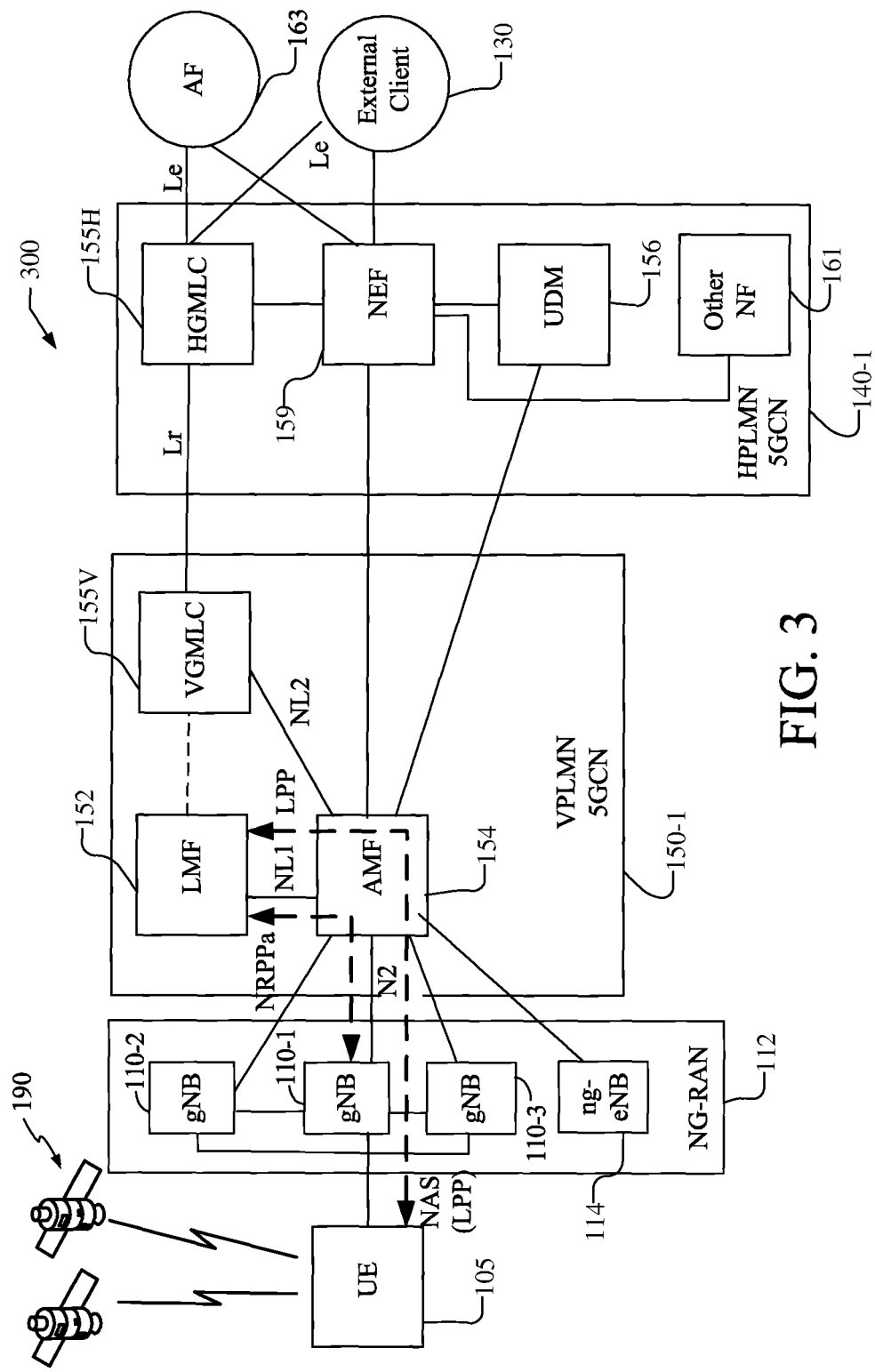
FIG. 3 is a block diagram illustrating a roaming reference architecture for user equipment (UE) location determination using beamformed PRS transmissions.

FIG. 3 illustrates a communication system 300 that is similar to the communication system 200 shown in FIG. 2, but supports location for a roaming UE 105. In the communication system 300, the core network 5GCN 150-1 that is in communication with the UE 105 via the NG-RAN 112 is a visited network, i.e., Visited Public Land Mobile Network (VPLMN), which is in communication with a home network 5GCN, i.e., Home Public Land Mobile Network (HPLMN) 140-1. In communication system 300, the VPLMN 5GCN 150-1 includes the Location Management Function (LMF) 152. The LMF 152 in communication system 300 may perform the same or almost the same functions and operations as LMF 152 in the non-roaming communication system of FIG. 2. The VPLMN 5GCN 150-1 also includes a Visited Gateway Mobile Location Center (VGMLC) 155V, which is similar to the GMLC 155 in the non-roaming communication system of FIG. 2, and is designated as 155V to indicate that it is located in the visited network for UE 105. As illustrated in FIG. 3, the VGMLC 155V connects to the AMF 154 and may connect to the LMF 152 in the VPLMN 5GCN 150-1.

As illustrated, HPLMN 5GCN 140-1 may include a Home GMLC (HGMLC) 155H that may be connected to the VGMLC 155V (e.g., via the Internet). The HGMLC 155H may be similar to the GMLC 155 in the non-roaming communication system of FIG. 2, and is designated as 155H to indicate that it located in the home network for UE 105. The VGMLC 155V and HGMLC 155H may be sometimes collectively and generically referred to herein as GMLC 155. The HGMLC 155H is in communication with the external client 130 in the HPLMN 140-1 and optionally with AF 163. The NEF 159 may also be in communication with the external client 130 and/or AF 163 and may operate as NEF 159 as discussed in FIG. 2. The NEF 159 may provide location access to UE 105 on behalf of external clients such as external client 130 and/or AF 163 as discussed in FIG. 2. One or more of the NEF 159 and HGMLC 155H may be connected to external client 130 and/or AF 163, e.g., through another network, such as the Internet. In some cases, an NF 161 in HPLMN 140-1 may request the location of UE 105 from NEF 159 as discussed in FIG. 2.

Figure 4:
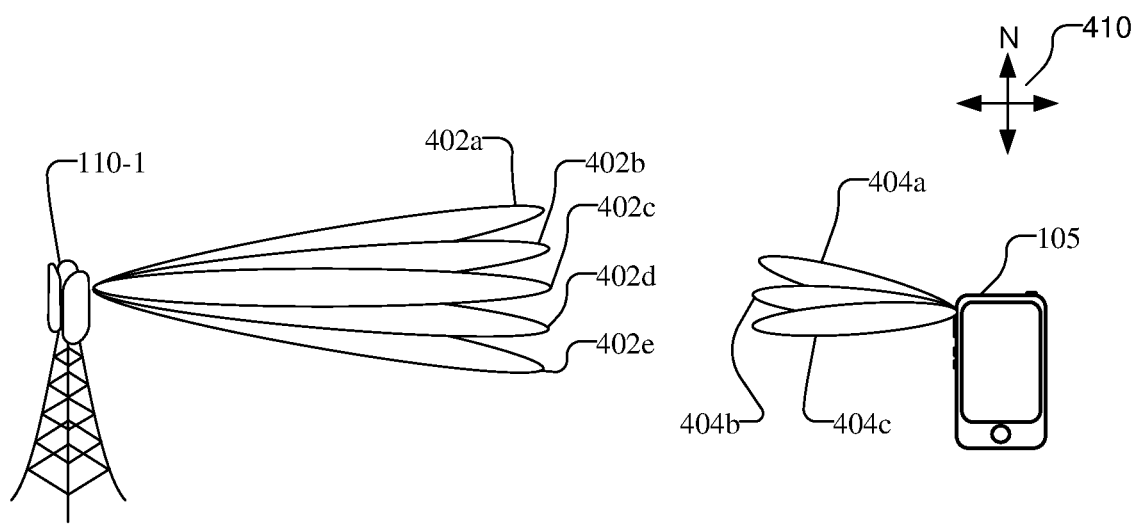
FIG. 4 illustrates a base station transmitting directed beams at different Angles of Departures (AODs) and a UE using receiver beams at different Angles of Arrival (AOA) to receive the directed beams.

FIG. 4 illustrates a UE 105 and a base station 110-1 producing a number of directed beams formed along specific AODs. The beams may be directed one after another (e.g. sequentially) or may be directed with some overlap in time (e.g. simultaneously). The beams transmitted by the base station 110-1 are transmitted in a directed way, e.g., beamformed along specific AODs, and are received by the UE 105 in a directed way as well, e.g., along specific AOAs. FIG. 4, by way of example, illustrates a number of transmission (Tx) beams 402a, 402b, 402c, 402d, and 402e transmitted by the base station 110-1 along different AODs and a number of receiver (Rx) beams 404a, 404b, and 404c from the UE 105 along different AOAs. Each transmitted beam may be identified by the base station 110-1 using Synchronization Signal Blocks (SSBs). The SSB index may then map to each transmitted beam. In NR, a gNB may support up to 64 beams, but need not activate all of the beams, but will indicate which beams are activated.

During the beam latching procedure, the UE 105 does an RxTx pairing, where the Tx beams are mapped to the Rx beams. For example, the best Rx beam will be selected for receiving the best Tx beam from base station 110-1. With Rx beam matching (or Rx beam measurement), the UE 105 may use several antennas or an antenna array to acquire and measure a signal in such a manner that a signal arriving over a certain narrow range of contiguous horizontal angles and/or a certain narrow range of contiguous vertical angles is received and measured with higher strength than signals arriving from other directions. Rx beam matching is the inverse of beam forming. By finding the Rx beam and associated angles of azimuth and elevation that maximize received signal strength, the UE 105 is able to measure an AOA. The AOA may be expressed relative to a global reference frame 410 shared with the base station (e.g. where reference frame 410 includes known horizontal and vertical directions such as North-South-East-West and "up/down"). For example, the orientation of a local reference frame of the UE 105 may be measured with respect to the global reference frame 410, e.g., using a magnetometer(s), electronic compass, gyroscopes, etc. The antenna array in the UE 105 has a known orientation with respect to the UE's local reference frame. The Rx beams generated using the UE antenna array each have a known angle with respect to the antenna array (or local reference frame). Accordingly, an AOA of a Rx beam with respect to the antenna array may be expressed with respect to the global reference frame 410. Similarly, the AOD of the Tx beam at the base station 110-1 may be expressed with respect to the global reference frame 410 as the antenna array of the base station 110-1 can have a known and fixed orientation with respect to the global reference frame 410.

If a directed PRS is received via LOS, the AOA would equal (or be the opposite of) the AOD. The equality or oppositeness depends on how the angles are expressed—e.g. the angles would be opposite if the UE 105 measures AOA towards the base station source and would be equal if the UE 105 measures AOA in the direction of the signal propagation.

The measured AOA of the Tx beam is the angle of the paired Rx beam. Using the AOA of the Rx beam or the AOD of the TX beam, the direction between the UE 105 and base station 110-1 can be estimated.

Beam latching, also referred to as RxTx pairing, is illustrated FIG. 4. Assume, as an example, that PRS beam 402c in FIG. 4 can be received LOS by UE 105 and that other PRS beams 402a, 402b, 402d and 402e cannot be received LOS by UE 105. Signals outside of, but still generated as part of the transmission of, these other PRS beams may still be received by UE 105 but would have reduced signal power (or equivalently reduced signal strength) at UE 105, with a signal power reduction factor of Ax, where x=a, b, c, d, or e, with Ac=1 and Aa, Ab, Ad, Ae<1. Similarly, UE 105 can measure the received signal power of each PRS beam using Rx beam 404a, 404b or 404c. Assume in this example that Rx beam 404b is directed towards (and thus in LOS to) base station 110-1 and that Rx beams 404a and 404c are pointing in other directions as shown in FIG. 4. Any signal received from base station 110-1 by UE 105 is assumed to arrive at UE 105 along an LOS path (even if transmission was intended for another direction). Therefore, the signal power measured by UE 105 will be highest using Rx beam 404b and will be reduced for other Rx beams by a reduction factor Bz, where z=a, b or c and Bb=1, and Ba, Bc<1. As illustrated in FIG. 4, there are 5 Tx beams 402x (for x=a, b, c, d or e) and 3 Rx beams 404y (for y=a, b or c) allowing 15 different combinations Cxy of RxTx measurements by UE 105. Assuming all PRS beams are transmitted with the same power, the highest measured signal power will be for the combination Ccb (for PRS beam 402c and Rx beam 404b). Other combinations Cxz will have a signal power reduced by a factor Ax*Bz, where one or both of Ax and Bz are less than one. UE 105 may then assume that the strongest measured RxTx combination corresponds to a PRS beam (Tx) that is LOS to UE 105 using an Rx beam that is also LOS to base station 110-1. Alternatively, UE 105 may report some or all of the signal measurements for the different Cxz (RxTx) combinations to a location server such as LMF 152 which may perform the same type of evaluation. The beam latching process therefore enables UE 105 or LMF 152 to detect a PRS beam that is LOS to UE 105 and to determine the AOA for this PRS beam (via the direction of the Rx beam used in the measurement).

When a base station is in the LOS of a UE, one or more of the directed beams transmitted by the base station (assuming there is overlap or near overlap of beams) may be received by the UE 105 along the LOS as previously described. Other directed beams from the base station, however, may also be received by the UE 105 after reflecting off of one or more structures, such as buildings, which is referred to as multi-path. The accuracy of an estimate of the direction between the base station and the UE depends on whether the beam used in the estimate is a LOS beam or a multi-path beam. If all measurement information used in the location estimate is derived from beams that are LOS beams, the direction estimate will be accurate, otherwise, with the use of measurement information from one or more multi-path beams, the direction estimate will be less accurate.

Figure 5:
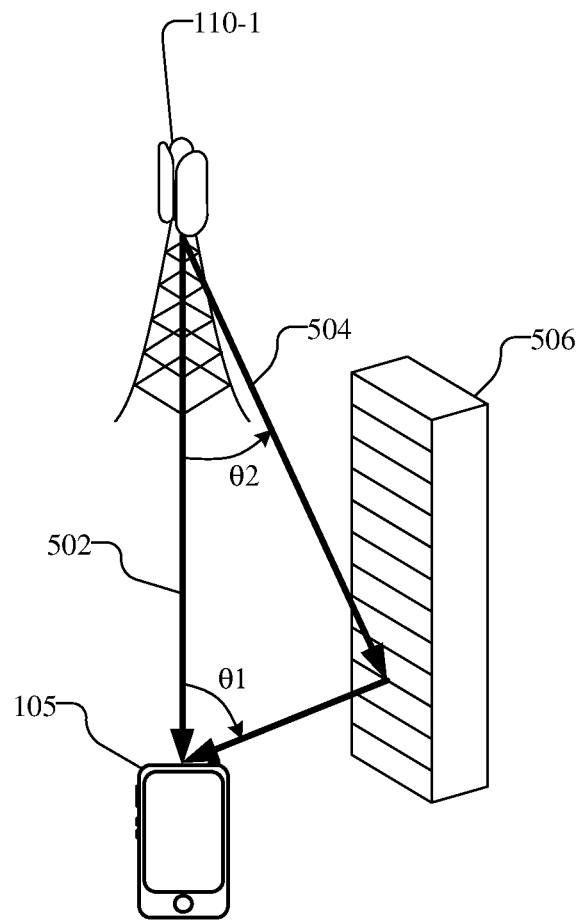
FIG. 5 illustrates a base station transmitting a Line Of Sight (LOS) beam and a multi-path directed beam, both of which are received by the UE.

FIG. 5 illustrates the base station 110-1 transmitting two directed beams 502 and 504, both of which are received by the UE 105. Beams 502 and 504 are illustrated as lines in FIG. 5, but it should be understood that each beam is formed with a finite width, e.g., 5-10 degrees, and that there may be multiple beams transmitted between beams 502 and 504. As illustrated, beam 502 is a Line Of Sight beam and is received directly by the UE 105. Beam 504, however, is reflected off a building 506 before being received by the UE 105, and is thus a multi-path beam. In order to improve location estimation accuracy, use of measurement information derived from the multi-path beam should be avoided.

The multi-path beam may be identified in several ways. For example, the received signal strength (RSSI) of the multi-path beam 504 may be lower than the received signal strength of the Line Of Sight beam 502. Additionally or alternatively, the time of arrival of the multi-path beam 504 will be later than the Line Of Sight beam 502. For example, if the beams 502 and 504 were to be transmitted at the same time by base station 110-1, the multi-path beam 504 would arrive after the Line Of Sight beam 502. As the beams 502 and 504 are transmitted at different times by base station 110-1, the beams may be transmitted pursuant to a known schedule and, accordingly, a difference between an expected time of arrival and an actual time of arrival of a beam may be used to indicate whether a beam is a LOS or a multi-path beam, e.g., the smallest difference between expected and actual time of arrival is likely a LOS beam and a larger difference indicates a multipath beam.

Another way to identify a multi-path beam is based on the AOA of the received beams. For example, the UE 105 may measure a differential AOA (DAOA) (θ1) between the pair of beams 502 and 504 from the base station 110-1. A DAOA is typically the difference between a pair of AOAs. The DAOA may be measured by the UE 105 according to the UE Rx beams used to receive each of two different Tx beams from a base station. For example, if receive beam RX1 receives transmit beam TX1 (e.g., using beam latching discussed above) and receive beam RX2 receives transmit beam TX2, the DAOA is the angle between receive beam RX1 and receive beam RX2.

The DAOA may be compared (at the UE 105 or at a location server 152) with a known differential AOD (DAOD) (θ2) between the pair of beams 502 and 504 as transmitted by the base station 110-1. A DAOD is typically the difference between a pair of AODs. If the DAOA and DAOD are not equal, at least one of the beams would be a multi-path beam. It should be noted that even if the magnitudes of the DAOA and DAOD angles, θ1 and θ are the same, the sign of the DAOA and DAOD angles may be used to determine if a beam is a multi-path beam. The technique discussed for FIG. 5 may be combined with the technique discussed below for FIG. 6 to help determine beams which are LOS.

It is noted that, due to a finite beam width, the UE 105 might receive two or more Line Of Sight beams from base station 110-1 shown in FIG. 5. For example, another light-of-sight beam (not shown in FIG. 5) may be received by UE 105 along with beam 502, and a comparison of the DAOA and DAOD of the pair of Line Of Sight beams may be used to confirm that beam 502 and the other beam are Line Of Sight. In this example, the DAOA and DAOD might be zero if both beams originate at the same location, though use of different antennas at base station 110-1 for the two beams (e.g. if remote radio heads are used) could create a non-zero DAOA and DAOA.

Once it is determined that beam 504 is multipath and beam 502 is LOS, the Line Of Sight beam 502 may be used to determine the location of the UE 105 in any desired positioning process. For example, the AOA, the measured RTT, TOA, etc. of the Line Of Sight beam 502, may be used to determine the location of the UE 105.

Figure 6:
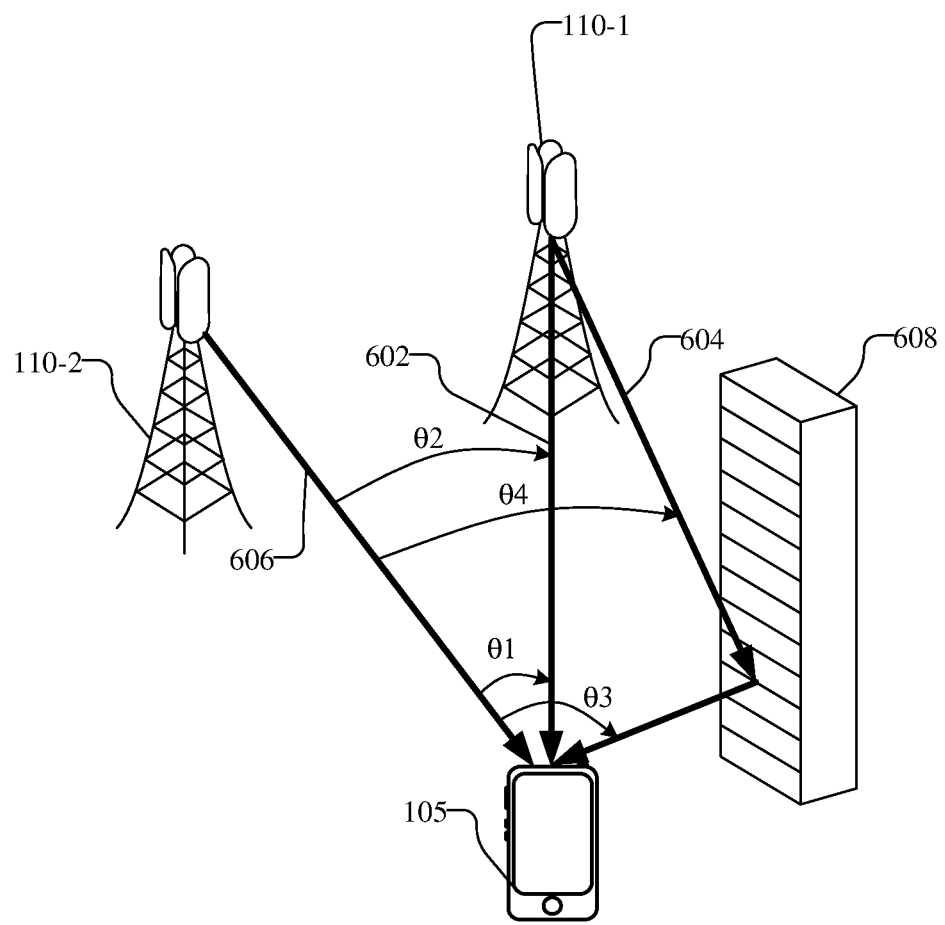
FIG. 6 illustrates two base station transmitting directed beams include LOS beams and a multi-path beam.

FIG. 6 illustrates two base stations 110-1 and 110-2 transmitting directed beams that are received by the UE 105. Beams 602, 604 and 606 are illustrated as lines in FIG. 6 (e.g. may each correspond to a center PRS), but it should be understood that each beam is formed with a finite width, e.g., 5-10 degrees, and that there may be multiple beams transmitted between beams 602 and 604. As illustrated, beam 602 transmitted by base station 110-1 is a Line Of Sight beam and is received directly by the UE 105. Beam 604 transmitted by base station 110-1, however, is reflected off a building 608 before being received by the UE 105, and is thus a multi-path beam. Beam 606 transmitted by a different base station 110-2 is a Line Of Sight beam and is received directly by the UE 105.

The multi-path beam may be identified using the DADA and DAOD. For example, when the directed beams are sent by different base stations 110-1 and 110-2, the UE 105 may measure the differential angle of arrival (DADA) between the beams. As discussed above, the DADA may be measured by the UE 105 according to the UE Rx beams that receive each of two different Tx beams from the two base stations (e.g., using beam latching). For example, if receive beam RX1 receives transmit beam TX1 from a first base station and receive beam RX2 receives transmit beam TX2 from a second base station, the DADA is the angle between receive beam RX1 and receive beam RX2.

The DAOD between two directed beams transmitted from different base stations 110-1 and 110-2 may be determined using the known AOD from each base station, which may be referenced to a global coordinate system. The DAOA may be compared (at the UE 105 or at a location server 152) with the known DAOD between directed beam pairs. For example, the DAOA θ1 between beams 606 and 602 measured by the UE 105 may be compared to the known DAOD θ2, and the DAOA θ3 between beams 606 and 604 measured by the UE 105 may be compared to the known DAOD θ4. If the measured DAOA equals the known DAOD, then it is implied that both beams are line of sight beams at the UE 105.

Once the Line of Sight beams are identified, the Line Of Sight beams 602 and 606 may be used to determine the location of the UE 105. For example, the location may be determined using AOA from the two beams, from a point (or a small area) of intersection of the two beams based on known AODs and known base station locations via triangulation, or other methods may be used. Other positioning processes may be used if desired, such as OTDOA (or RTT), e.g., where the comparison of the DAOA and DAOD are used to verify that the directed beams received for an RSTD measurement (or two RTT measurements) are Line Of Sight at the UE 105. This could greatly improve OTDOA (or RTT) accuracy since multipath can be a main cause of inaccuracy. If desired, the process may be repeated for other pairs of base stations resulting in an accurate UE location if the base stations are nearby and have good geometry relative to the UE.

One advantage of applying a comparison of DAOA measured by a UE 105 to a known DAOD for directed beams received from one or more base stations as exemplified in FIGS. 5 and 6 is that UE 105 may not need to measure AOAs relative to a global reference frame (e.g. global reference frame 410), but can instead measure AOAs relative to a local reference frame of UE 105. This can arise because a DAOA expresses a difference between a pair of AOAs and does not depend on the reference frame used to measure the AOAs. If a location of UE 105 can then be determined using the AODs rather than AOAs, UE 105 implementation may be simplified by avoiding a need for UE 105 to determine its exact orientation in a global reference frame.

Figure 7:
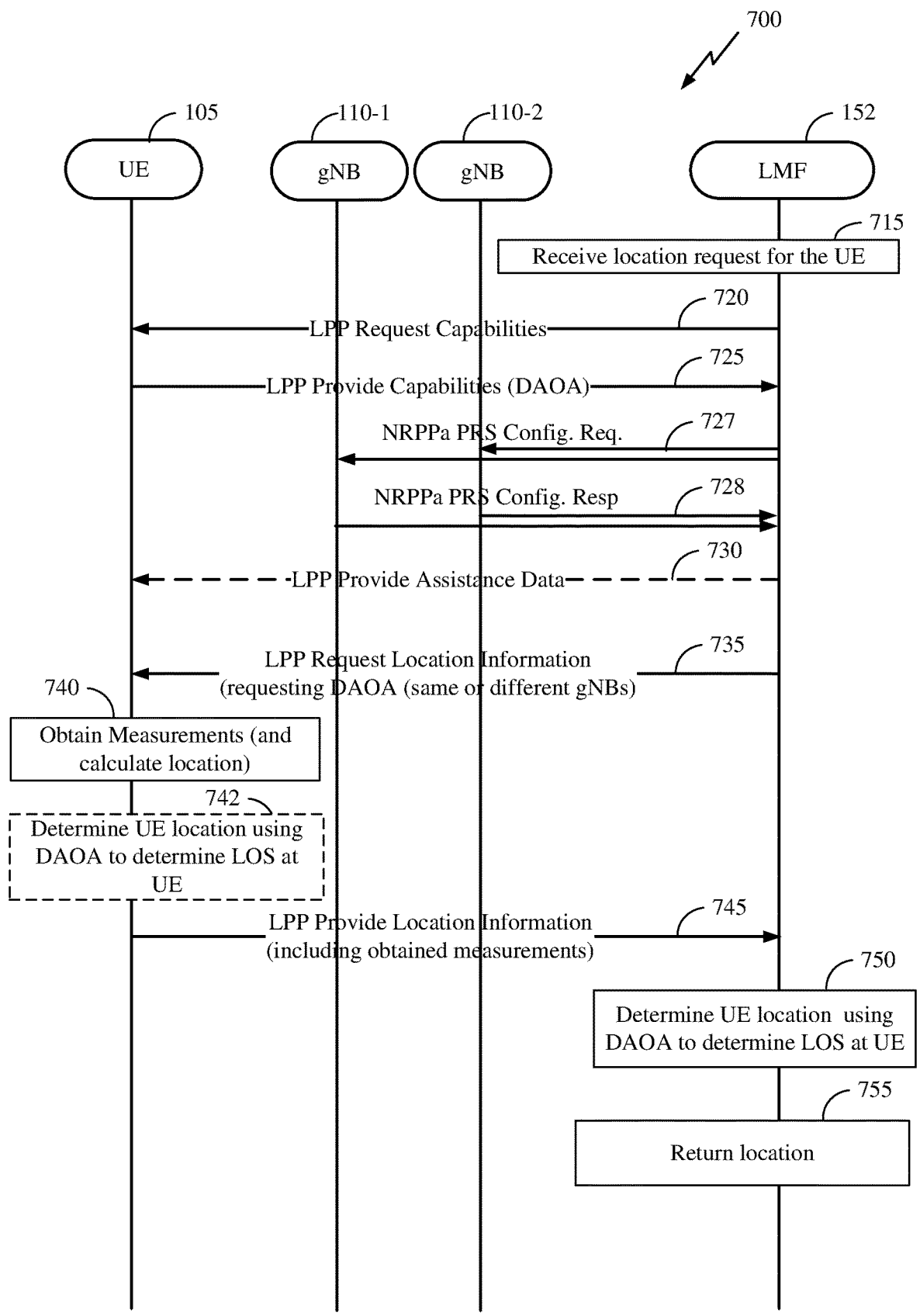
FIG. 7 shows a signaling flow illustrating a method for supporting location services for a UE using differential AOA (DAOA) and differential AOD (DAOD) for pairs of directed beams.

FIG. 7 shows a signaling flow 700, applicable to communication system 100 or 200 shown in FIGS. 2 and 3, illustrating communication between the UE 105 and the LMF 152 that may take place in accordance with the techniques provided herein. It can be noted that here, messages are provided in accordance with the 3GPP LPP protocol as an example. However, embodiments are not so limited (e.g. a combination of LPP and LPPe, referred to as LPP/LPPe, might be used in another embodiment).

At block 715, the process may be initiated when the LMF 152 receives a location request for the UE 105 e.g., from the AMF 154 or GMLC 155, which may have originated from the External Client 130. At action 720, the LMF 152 may send an LPP Request Capabilities message to the UE 105. The UE 105 can respond in accordance with the LPP protocol by providing various location-related capabilities, such as capabilities to support different position methods such as Assisted GNSS (A-GNSS), OTDOA, RTK, Enhanced Cell ID (ECID), and to support different network measurements and assistance data, including supporting measurement of DAOA and supporting determining line of sight beams using DAOA and DAOD. These capabilities are provided by UE 105 at action 725 in the LPP Provide Capabilities message sent by the UE 105 to the LMF 152.

At action 727, the LMF 152 may send an NRPPa PRS Configuration Request message to the serving gNB 110-1 or both the serving gNB 110-1 and gNB 110-2, and requests the schedule for PRS transmissions, including the AOD for each PRS transmission.

At action 728, the serving gNB 110-1 and gNB 110-2 (if requested) return an NRPPA PRS configuration Response message with the schedule for PRS transmissions, including the AOD (and possibly the PRS beam horizontal and vertical width) for each PRS transmission. Alternatively, the LMF 152 may obtain the AOD for each PRS transmission for each base station from a local database instead of an NRPPa PRS configuration Response message.

At action 730, the LMF 152 may send the UE 105 an LPP Provide Assistance Data message, in response to receiving the LPP Provide Capabilities message at action 725. Here, the positioning assistance data (PAD) provided in the LPP Provide Assistance Data message can be commensurate with the capabilities of the UE 105, as indicated in the LPP Provide Capabilities message. For example, if the UE 105 indicates that it is capable of measuring DAOA and comparing the DAOA to a DAOD, the LMF 152 may provide the UE 105 with the positions of the nearby base stations, e.g., gNBs 110-1 and 110-2 and a schedule of directed beam transmissions from the base stations, including the AODs of each PRS transmission, with which the UE 105 can determine the DAOD between directed beams. In some implementations, some or all of the positioning assistance data may be provided to the UE 105 in a point to point message from the serving base station 110-1 or from a broadcast message from a base station. If the UE 105 indicates that it is capable of obtaining location-related measurements for OTDOA, the LMF 152 may provide a list of nearby cells (e.g. based on a current serving cell or serving gNB 110-1 for the UE 105) and information (e.g. timing, frequency, bandwidth) for signals (e.g. PRS or CRS signals) transmitted within these cells by corresponding base stations (e.g. gNB 110-1 and gNB 110-2), which may enable RSTD measurements by UE 105. Similarly, if UE 105 indicates support of A-GNSS in the LPP Provide Capabilities message sent at action 725, the LMF 152 may include information for visible satellites 190 in the LPP Provide Assistance Data message sent at action 730. In one embodiment, action 730 may be preceded by UE 105 sending an LPP Request Assistance Data message to LMF 152 to request assistance data (not shown in FIG. 7).

At action 735, the LMF 152 sends an LPP Request Location Information message to the UE 105. Here, the LMF 152 may request location-related measurements (e.g. DAOA and/or AOA measurements from a single or multiple base stations and/or measurements for A-GNSS, OTDOA and/or RTK). In some embodiments, the LPP Request Location Information message may request that UE 105 compute a location estimate from these measurements (e.g. if the position method is UE based OTDOA or UE based A-GNSS) and may also include a requested accuracy for any location measurements or location estimate and/or a maximum response time.

At block 740, the UE 105 may obtain measurements requested at action 735, including DAOA and/or AOA measurements. For example, for a pair of directed beams, the UE 105 may measure the AOA of each directed beam and may determine the difference between the AOAs to determine the DAOA. Location related measurements obtained by UE 105 may be obtained for RF signals transmitted by gNBs 110-1 and 110-2 and/or satellites 190 (shown in FIG. 2). For example, location related measurements may include measurements of RSTD obtained by measuring PRS or other reference signals (e.g. CRS signals) transmitted by gNBs 110-1 and 110-2, measurements of RTT obtained by measuring signals transmitted from and/or to gNBs 110-1 and 110-2, and/or measurements of pseudorange, code phase or carrier phase obtained by measuring one or more navigation signals transmitted by each of one or more satellites 190. In some embodiments, UE 105 may also calculate a location estimate based on the obtained location measurements. The UE 105 may use assistance data received at action 730 to help obtain the location measurements and/or determine any location estimate.

At optional action 742, the UE 105 may determine the UE estimated location, e.g., using the DAOA and/or AOAs to determine Line Of Sight at the UE 105 (e.g. as described for FIGS. 5 and 6). For example, the UE 105 may use the AODs received in the PAD obtained at action 730 to determine the DAOD for a directed beam pair that are received by the UE 105. The UE 105 may compare the DAOD with the measured DAOA, e.g., obtained at action block 740, for the directed beam pair to determine if each directed beam in the pair of directed beams is Line Of Sight (LOS), or if one or more of the directed beams is a multi-path beam (e.g. as described for FIGS. 5 and 6). The UE 105 may use at least one of the directed beams to estimate the location of the UE 105 when both directed beams in the pair of directed beams are LOS. For example, the UE 105 may determine the location estimate using triangulation based on the pair of AODs for the pair of directed beams. The UE 105 may determine the location estimate using at least one of the AODs and a measured round trip time for the UE (e.g., obtained at block 740). The UE 105 may determine the location estimate using a Reference Signal Time Difference (RSTD) obtained for the pair of directed beams (e.g., using TOA measurements obtained at block 740) and obtaining the location estimate based on the RSTD (e.g. using OTDOA). The UE 105 may determine the location estimate using at least one of the directed beams in other manners if desired.

At action 745, information indicative of one or more location-related measurements (e.g. a location estimate or the location measurements) is sent to the LMF 152 by the UE 105 in an LPP Provide Location Information message. For example, the location measurements may include measurements of AOA, RTT, TOA, etc. for each of one or more received directed beams. If desired, the location measurements may further include a DAOA measurement for a directed beam pair determined in block 740.

At block 750, the LMF 152 can use the measurement information received at action 745 (comprising one or more location-related measurements or a location estimate) to determine (e.g. calculate or verify) an estimated location of the UE 105. For example, if AOAs for a directed beam pair is provided to LMF 152 at action 745, the LMF 152 may determine the DAOA for the directed beam pair. In some implementations, the UE 105 may provide the DAOA for a directed beam pair as part of the location related measurements in action 745, and the LMF 152 would not need to determine the DAOA for the directed beam pair. The LMF 152 may further determine the DAOD for the directed beam pair based on AODs for the directed beams in the pair obtained from a local database or received from one or more of the base stations, e.g., at message 728.

The LMF 152 may compare the DAOD with the DAOA for a directed beam pair to determine if both directed beams in the pair of directed beams are Line Of Sight (LOS), or if one or more of the directed beams is a multi-path beam. The LMF 152 may use at least one of the directed beams to estimate the location of the UE 105 when both directed beams in the pair of directed beams are LOS. For example, the LMF 152 may determine the location estimate using triangulation based on the pair of AODs for the pair of directed beams. The LMF 152 may determine the location estimate using at least one of the AODs and a measured round trip time for the UE (e.g., obtained at action 745). The LMF 152 may determine the location estimate using a Reference Signal Time Difference (RSTD) obtained for the pair of directed beams (e.g., using RSTD or TOA measurements obtained at action 745) and obtaining the location estimate based on the RSTD (e.g. using OTDOA). The LMF 152 may determine the location estimate using at least one of the directed beams in other manners if desired. The determined location estimate (and any accompanying uncertainty or expected error, if determined) may then be returned to the requesting entity, e.g., the AMF 154 or GMLC 155, at block 755.

Figure 8:
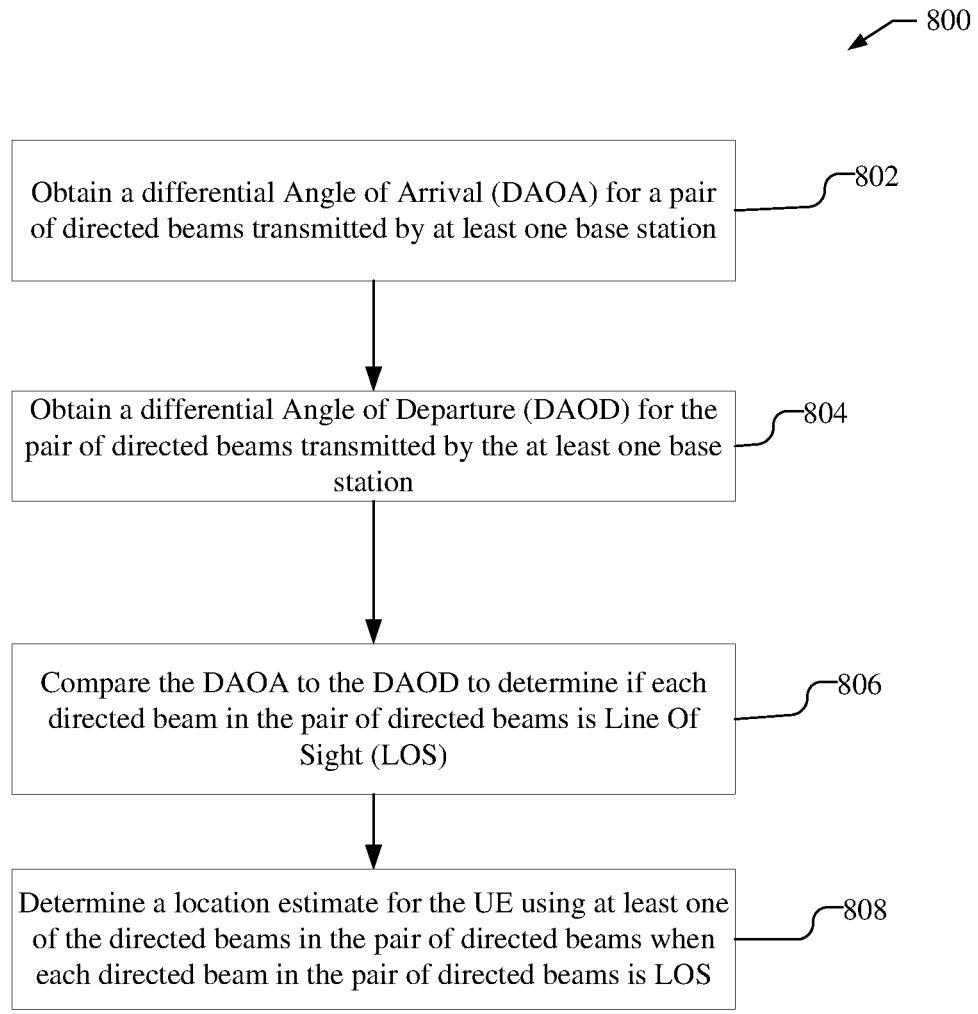
FIG. 8 shows a process flow illustrating a method for supporting location services for a UE using DAOA and DAOD for pairs of directed beams.

FIG. 8 shows a process flow 800 illustrating a method for supporting location services for a user equipment (UE) such as the UE 105 that is performed by an entity. Process flow 800 may be performed by the UE 105 or a location server, such as LMF 152, in a wireless network that supports that supports directed beam transmissions, i.e., beamforming, as discussed above.

Process flow 800 may start at block 802, where a differential Angle of Arrival (DAOA) is obtained for a pair of directed beams transmitted by at least one base station. By way of example, where the process is being performed by the UE 105, the DAOA may be obtained, e.g., by measurement of the AOA of each directed beam and determining a difference between the AOAs for each directed beam pair, e.g., as discussed at block 740 of FIG. 7 and as illustrated in FIGS. 4, 5 and 6. Where the process is being performed by the LMF 152, the DAOA may be obtained by receiving the DAOA in a message sent the UE 105, e.g., as discussed at block 745 of FIG. 7.

At block 804, a differential Angle of Departure (DAOD) may be obtained for the pair of directed beams transmitted by the at least one base station. By way of example, where the process is being performed by the UE 105, the DAOD may be obtained, e.g., as discussed at block 742 of FIG. 7 and as illustrated in FIGS. 4 and 5. Where the process is being performed by the LMF 152, the DAOD may be obtained, e.g., as discussed at block 750 of FIG. 7 and as illustrated in FIGS. 4 and 5.

At block 806, the DAOA may be compared to the DAOD to determine if each directed beam in the pair of directed beams is Line Of Sight (LOS), e.g., as at blocks 742 and 750 of FIG. 7 and as described for FIGS. 5 and 6.

At block 808, a location estimate for the UE may be determined using at least one of the directed beams in the pair of directed beams when each directed beam in the pair of directed beams is LOS, as described, e.g., at blocks 742 and 750 of FIG. 7.

In some implementations, the pair of directed beams are from a single base station, e.g., as illustrated in FIG. 5.

In some implementations, the pair of directed beams are from two different base stations, e.g., as illustrated in FIG. 6.

In some implementations, obtaining the DAOD comprises obtaining a pair of AODs for the pair of directed beams, e.g., as discussed at blocks 742 and 750 in FIG. 7. For example, the entity may be the UE, and obtaining the DAOA may comprise measuring the DAOA (e.g. by measuring an AOA for each directed beam and determining the difference of the AOAs), and obtaining the pair of AODs may comprise receiving the pair of AODs from a location server in a point to point message or from a base station in a broadcast message, e.g., as discussed at block 740 and action 730 in FIG. 7. In another example, the entity may be a location server, and obtaining the DAOA may comprise receiving the DAOA from the UE (or receiving a pair of AOAs from the UE and determining their difference), and obtaining the pair of AODs may comprise obtaining the pair of AODs from a local database or receiving the pair of AODs from the at least one base station, e.g., as discussed at action 745 and block 750 in FIG. 7. In one further implementation, determining the location estimate for the UE may comprises at least one of: triangulating the location estimate based on the pair of AODs; using at least one of the AODs and a measured round trip time for the UE; or obtaining a Reference Signal Time Difference for the pair of directed beams and obtaining the location estimate based on the RSTD, e.g., as discussed at blocks 742 or 750 in FIG. 7.

Figure 9:
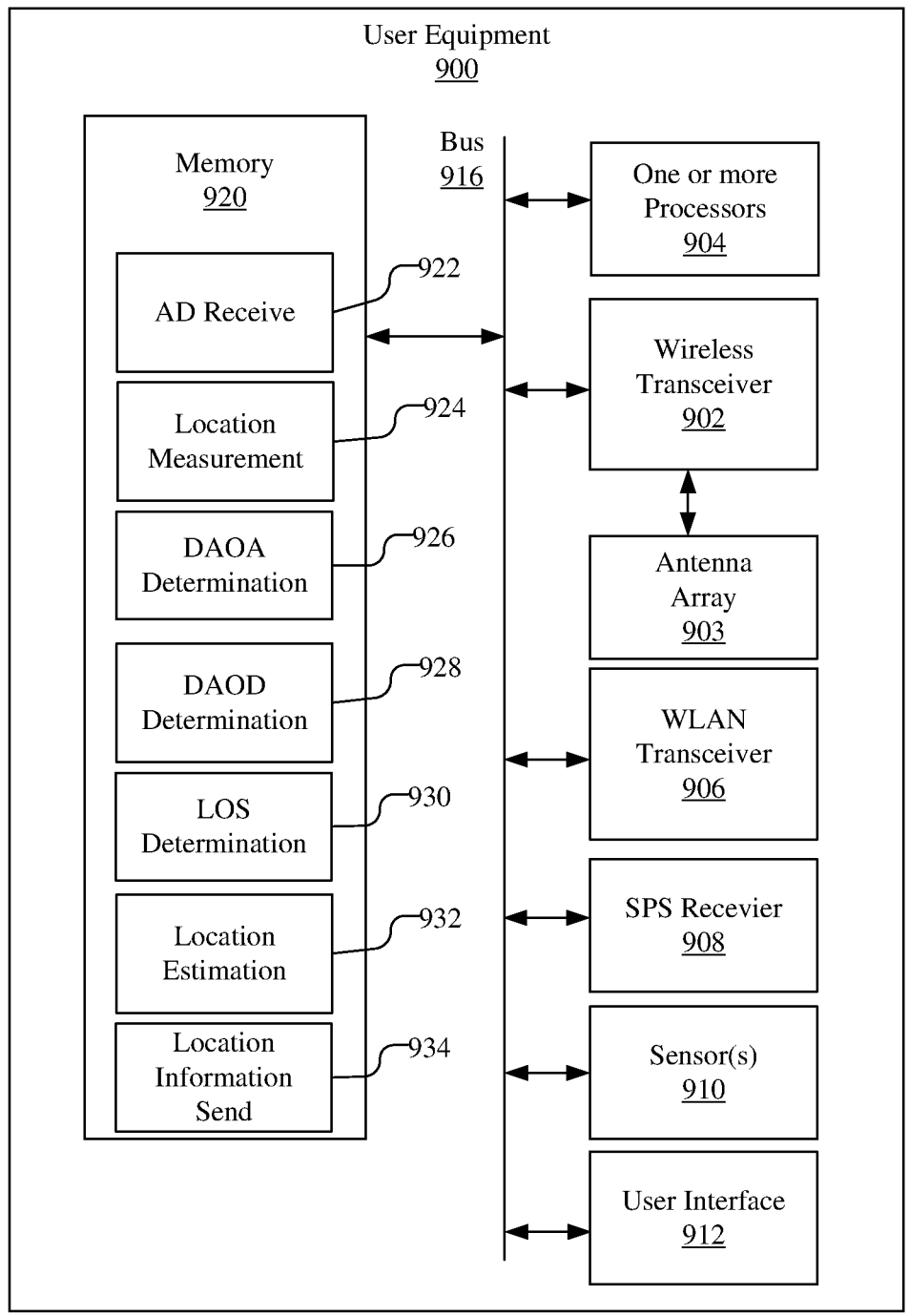
FIG. 9 is a block diagram of an embodiment of a UE capable of supporting location services for the UE.

FIG. 9 is a diagram illustrating an example of a hardware implementation of UE 900, such as UE 105 shown in FIGS. 1-7. The UE 900 may include a wireless transceiver 902 to wirelessly communicate with an NG-RAN 112, e.g., base stations such as gNB 110 or ng-eNB 114 (shown in FIGS. 2-3). The wireless transceiver 902 may be coupled to an antenna array 903 capable of beamforming receive beams at different azimuth angles. The UE 900 may also include additional transceivers, such a wireless local area network (WLAN) transceiver 906, as well as an SPS receiver 908 for receiving and measuring signals from SPS SVs 190 (shown in FIGS. 2-3). The UE 900 may further include one or more sensors 910, such as cameras, accelerometers, gyroscopes, electronic compass, magnetometer(s), barometer, etc. The sensors 910, for example, may be used to provide an orientation of a local reference frame in the UE 900 to a global reference frame. The UE 900 may further include a user interface 912 that may include e.g., a display, a keypad or other input device, such as virtual keypad on the display, through which a user may interface with the UE 900. The UE 900 further includes one or more processors 904 and memory 920, which may be coupled together with bus 916. The one or more processors 904 and other components of the UE 900 may similarly be coupled together with bus 916, a separate bus, or may be directly connected together or coupled using a combination of the foregoing. The memory 920 may contain executable code or software instructions that when executed by the one or more processors 904 cause the one or more processors to operate as a special purpose computer programmed to perform the algorithms disclosed herein.

As illustrated in FIG. 9, the memory 920 may include one or more components or modules that may be implemented by the one or more processors 904 to perform the methodologies described herein. While the components or modules are illustrated as software in memory 920 that is executable by the one or more processors 904, it should be understood that the components or modules may be dedicated hardware either in the one or more processors 904 or off the processors.

As illustrated, the memory 920 may include assistance data receive unit 922 that configures the one or more processors 904 to receive assistance data via wireless transceiver 902 from a base station, where the assistance data may include, e.g., schedule of directed beam transmissions and the Angle of Departure (AOD) for each directed beam for one or more base stations, as well the location of the base stations. A location measurement unit 924 configures the one or more processors 904 to perform location measurements of the directed beam transmissions, including determining the Angle of Arrival (AOA) of each received directed beam, which may be based on the receive beam that is beam formed by the antenna array 903. A differential AOA (DAOA) determination unit 926 configures the one or more processors 904 to determine the DAOA for pairs of received directed beams. A differential AOD (DAOD) determination unit 928 may configure the one or more processors 904 to determine the DAOD for pairs of received directed beams based on the received assistance data, e.g., the Angle of Departure (AOD) for each directed beam for the base stations and the locations of the base stations. A line of sight (LOS) determination unit 930 may configure the one or more processors 904 to determine whether at least one of the directed beams in each beam pair is a multi-path beam or a line of sight beam. For example, the LOS determination unit 930 may determine if the DAOA and DOAD for each pair of directed beams matches, e.g., by comparing the DAOA and DOAD, and may thus determine if the beams are LOS or multi-path, as discussed herein. A location estimation unit 932 may determine the location of the UE using measurement data from directed beams that are determined to be line of sight using known location estimation processes using AOA, RTT, TOA, etc. A location information send unit 934 configures the one or more processors 904 to transmit, e.g., via the wireless transceiver, location information to the location server. For example, the location information may be the DAOA for each pair of directed beams and the measurements associated with the directed beams determined using the location measurement unit 924 or the location estimate determined using location estimation unit 932 or both.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 920) and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 900 may be stored as one or more instructions or code on a non-transitory computer-readable storage medium such as memory 920. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 900 may be provided as signals on transmission media included in a communication apparatus. For example, a communication apparatus comprising part or all of UE 900 may include a transceiver having signals indicative of instructions and data. The instructions and data are stored on non-transitory computer readable media, e.g., memory 920, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 10:
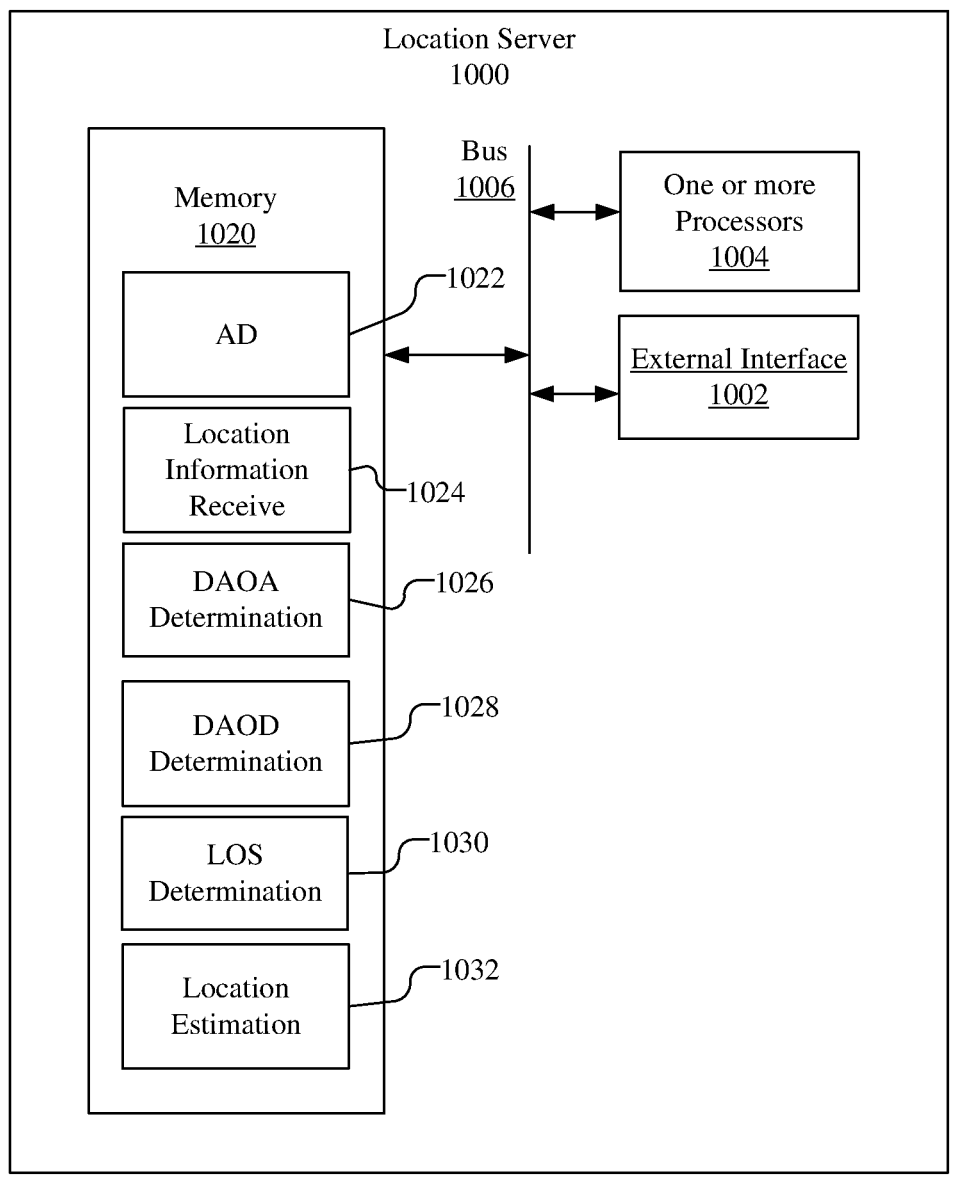
FIG. 10 is a block diagram of an embodiment of a location server capable of supporting location services for a UE.

FIG. 10 is a diagram illustrating an example of a hardware implementation of a location server 1000, such as LMF 152 shown in FIGS. 2-3 and 7. The location server 1000 may be, e.g., part of a wireless network such as a 5G Core network (5 GC). The location server 1000 includes, e.g., hardware components such as an external interface 1002, which may be a wired or wireless interface capable of connecting to a GMLC, such as GMLC 155, VGMLC 155V or HGMLC 155H, and AMF 154. The location server 1000 includes one or more processors 1004 and memory 1020, which may be coupled together with bus 1006. The memory 1020 may contain executable code or software instructions that when executed by the one or more processors 1004 cause the one or more processors 1004 to operate as a special purpose computer programmed to perform the procedures and techniques disclosed herein.

As illustrated in FIG. 10, the memory 1020 includes one or more components or modules that when implemented by the one or more processors 1004 implements the methodologies described herein. While the components or modules are illustrated as software in memory 1020 that is executable by the one or more processors 1004, it should be understood that the components or modules may be dedicated hardware either in the processors 1004 or off processor.

As illustrated, the memory 1020 may include an assistance data unit 1022 that configures the one or more processors 1004 to prepare and forward assistance data for a UE via external interface 1002, where the assistance data may include, e.g., schedule of directed beam transmissions and the Angle of Departure (AOD) for each directed beam for one or more base stations, as well the location of the base stations. A location information receive unit 1024 configures the one or more processors 1004 to receive, via external interface 1002, location information from the UE. For example, the location information may be the measurements associated with directed beams received by the UE, including Angle of Arrival (AOA) of each directed beam or the differential AOA (DAOA) for each pair of directed beams or a location estimate determined by the UE or both. A DAOA determination unit 1026 may configure the one or more processors 1004 to determine the DAOA for pairs of directed beams received by the UE, e.g., if the UE sends the AOA of the directed beams. A differential AOD (DAOD) determination unit 1028 may configure the one or more processors 1004 to determine the DAOD for pairs of directed beams based on the AOD for each directed beam for the base stations and the locations of the base stations. A line of sight (LOS) determination unit 1030 may configure the one or more processors 1004 to determine whether at least one of the directed beams in each beam pair is a multi-path beam or a line of sight beam. For example, the LOS determination unit 1030 may determine if the DAOA and DOAD for each pair of directed beams matches, e.g., by comparing the DAOA and DOAD, and may thus determine if the beams are LOS or multi-path, as discussed herein. A location estimation unit 1032 may determine the location of the UE using measurement data from directed beams that are determined to be line of sight using known location estimation processes using AOA, RTT, TOA, etc., e.g., received using the location information receive unit 1024.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1020) and executed by one or more processor units (e.g. processors 1004), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1020, and are configured to cause the one or more processors (e.g. processors 1004) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

An entity for supporting location services for a user equipment (UE), such as UE 900 or location server 1000, may include a means for obtaining a differential Angle of Arrival (DAOA) for a pair of directed beams transmitted by at least one base station, which may be, e.g., the wireless transceiver 902 and antenna array 903 and one or more processors 904 with dedicated hardware or implementing executable code or software instructions in memory 920 such as the location measurement unit 924 and DAOA determination unit 926 or the external interface 1002 and one or more processors 1004 with dedicated hardware or implementing executable code or software instructions in memory 1020 such as the location information receive unit 1024 and DAOA determination unit 1026. A means for obtaining a differential Angle of Departure (DAOD) for the pair of directed beams transmitted by the at least one base station may be, e.g., the wireless transceiver 902 and one or more processors 904 with dedicated hardware or implementing executable code or software instructions in memory 920 such as the AD receive unit 922 and DAOD determination unit 928 or the external interface 1002 and one or more processors 1004 with dedicated hardware or implementing executable code or software instructions in memory 1020 such as the DAOD determination unit 1028. A means for comparing the DAOA to the DAOD to determine if each directed beam in the pair of directed beams is Line Of Sight (LOS) may be, e.g., the one or more processors 904 with dedicated hardware or implementing executable code or software instructions in memory 920 such as the LOS determination unit 930 or the one or more processors 1004 with dedicated hardware or implementing executable code or software instructions in memory 1020 such as the LOS determination unit 1030. A means for determining a location estimate for the UE using at least one of the directed beams in the pair of directed beams when each directed beam in the pair of directed beams is LOS may be, e.g., the one or more processors 904 with dedicated hardware or implementing executable code or software instructions in memory 920 such as the location estimation unit 932 or the one or more processors 1004 with dedicated hardware or implementing executable code or software instructions in memory 1020 such as the location estimation unit 1032.

In some implementations, the means for obtaining the DAOD may include a means for obtaining a pair of AODs for the pair of directed beams, which may be, e.g., the wireless transceiver 902 and one or more processors 904 with dedicated hardware or implementing executable code or software instructions in memory 920 such as the AD receive unit 922 or the external interface 1002 and one or more processors 1004 with dedicated hardware or implementing executable code or software instructions in memory 1020 such as the DAOD determination unit 1028. For example, in some implementations, the entity may be the UE, wherein the means for obtaining the DAOA may include a means for measuring the DAOA, which may be, e.g., the wireless transceiver 902 and antenna array 903 and one or more processors 904 with dedicated hardware or implementing executable code or software instructions in memory 920 such as the location measurement unit 924, and the means for obtaining the pair of AODs may include a means for receiving the pair of AODs from a location server in a point to point message or from a base station in a broadcast message, which may be, e.g., the wireless transceiver 902 and one or more processors 904 with dedicated hardware or implementing executable code or software instructions in memory 920 such as the AD receive unit 922. In another example, the entity may be a location server, and the means for obtaining the DAOA may include a means for receiving the DAOA from the UE, which may be, e.g., the external interface 1002 and one or more processors 1004 with dedicated hardware or implementing executable code or software instructions in memory 1020 such as the location information receive unit 1024, and the means for obtaining the pair of AODs may include means for obtaining the pair of AODs from a local database or receiving the pair of AODs from the at least one base station, which may be, e.g., or the external interface 1002 and one or more processors 1004 with dedicated hardware or implementing executable code or software instructions in memory 1020 such as the DAOD determination unit 1028.

In some implementations, the means for determining the location estimate for the UE may be at least one of a means for triangulating the location estimate based on the pair of AODs; means for using at least one of the AODs and a measured round trip time for the UE; means for obtaining a Reference Signal Time Difference for the pair of directed beams and obtaining the location estimate based on the RSTD, which may be, e.g., the one or more processors 904 with dedicated hardware or implementing executable code or software instructions in memory 920 such as the location estimation unit 932 or the one or more processors 1004 with dedicated hardware or implementing executable code or software instructions in memory 1020 such as the location estimation unit 1032.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE), performed by an entity, comprising:
    obtaining a differential Angle of Arrival (DAOA) for a pair of directed beams transmitted by at least one base station and received at the UE, wherein the DAOA is obtained from measurements of the pair of directed beams performed by the UE;
    obtaining a differential Angle of Departure (DAOD) for the pair of directed beams transmitted by the at least one base station;
    comparing the DAOA to the DAOD to determine if each directed beam in the pair of directed beams is Line Of Sight (LOS) between the at least one base station and the UE;
    determining a location estimate for the UE using at least one of the directed beams in the pair of directed beams when each directed beam in the pair of directed beams is LOS; and
    providing the location estimate to a requesting entity.

2. The method of claim 1, wherein the pair of directed beams are from a single base station.

3. The method of claim 1, wherein the pair of directed beams are from two different base stations.

4. The method of claim 1, wherein obtaining the DAOD comprises obtaining a pair of angles of departure (AODs) for the pair of directed beams.

5. The method of claim 4, wherein the entity is the UE, wherein obtaining the DAOA comprises measuring the DAOA, wherein obtaining the pair of AODs comprises receiving the pair of AODs from a location server in a point to point message or from a base station in a broadcast message.

6. The method of claim 4, wherein the entity is a location server, wherein obtaining the DAOA comprises receiving the DAOA from the UE, wherein obtaining the pair of AODs comprises obtaining the pair of AODs from a local database or receiving the pair of AODs from the at least one base station.

7. The method of claim 4, wherein determining the location estimate for the UE comprises at least one of:
    triangulating the location estimate based on the pair of AODs;
    using at least one of the pair of AODs and a measured round trip time for the UE; or
    obtaining a Reference Signal Time Difference for the pair of directed beams and obtaining the location estimate based on the Reference Signal Time Difference.

8. An entity for supporting location services for a user equipment (UE), the entity comprising:
    an external interface for receiving and sending messages in a network;
    memory configured to store instructions; and
    at least one processor coupled to the external interface and the memory, the at least one processor configured by the instructions stored in the memory to:
        obtain a differential Angle of Arrival (DAOA) for a pair of directed beams transmitted by at least one base station and received at the UE, wherein the DAOA is obtained from measurements of the pair of directed beams performed by the UE;
        obtain a differential Angle of Departure (DAOD) for the pair of directed beams transmitted by the at least one base station;
        compare the DAOA to the DAOD to determine if each directed beam in the pair of directed beams is Line Of Sight (LOS) between the at least one base station and the UE;
        determine a location estimate for the UE using at least one of the directed beams in the pair of directed beams when each directed beam in the pair of directed beams is LOS; and
        provide the location estimate to a requesting entity.

9. The entity of claim 8, wherein the pair of directed beams are from a single base station.

10. The entity of claim 8, wherein the pair of directed beams are from two different base stations.

11. The entity of claim 8, wherein the at least one processor is configured to obtain the DAOD by being configured to obtain a pair of angles of departure (AODs) for the pair of directed beams.

12. The entity of claim 11, wherein the entity is the UE, wherein the at least one processor is configured to obtain the DAOA by being configured to measure the DAOA, wherein the at least one processor is configured to obtain the pair of AODs by being configured to receive the pair of AODs from a location server in a point to point message or from a base station in a broadcast message.

13. The entity of claim 11, wherein the entity is a location server, wherein the at least one processor is configured to obtain the DAOA by being configured to receive the DAOA from the UE, wherein the at least one processor is configured to obtain the pair of AODs by being configured to obtain the pair of AODs from a local database or receiving the pair of AODs from the at least one base station.

14. The entity of claim 11, wherein the at least one processor is configured to determine the location estimate for the UE by being configured to at least one of:
    triangulate the location estimate based on the pair of AODs;
    use at least one of the pair of AODs and a measured round trip time for the UE; or
    obtain a Reference Signal Time Difference for the pair of directed beams and obtaining the location estimate based on the Reference Signal Time Difference.

15. An entity for supporting location services for a user equipment (UE), the entity comprising:
    means for obtaining a differential Angle of Arrival (DAOA) for a pair of directed beams transmitted by at least one base station and received at the UE, wherein the DAOA is obtained from measurements of the pair of directed beams performed by the UE;
    means for obtaining a differential Angle of Departure (DAOD) for the pair of directed beams transmitted by the at least one base station;

means for comparing the DAOA to the DAOD to determine if each directed beam in the pair of directed beams is Line Of Sight (LOS) between the at least one base station and the UE;
means for determining a location estimate for the UE using at least one of the directed beams in the pair of directed beams when each directed beam in the pair of directed beams is LOS; and
means for providing the location estimate to a requesting entity.

16. The entity of claim 15, wherein the pair of directed beams are from a single base station.

17. The entity of claim 15, wherein the pair of directed beams are from two different base stations.

18. The entity of claim 15, wherein the means for obtaining the DAOD comprises means for obtaining a pair of angles of departure (AODs) for the pair of directed beams.

19. The entity of claim 18, wherein the entity is the UE, wherein the means for obtaining the DAOA comprises means for measuring the DAOA, wherein the means for obtaining the pair of AODs comprises means for receiving the pair of AODs from a location server in a point to point message or from a base station in a broadcast message.

20. The entity of claim 18, wherein the entity is a location server, wherein the means for obtaining the DAOA comprises means for receiving the DAOA from the UE, wherein the means for obtaining the pair of AODs comprises means for obtaining the pair of AODs from a local database or receiving the pair of AODs from the at least one base station.

21. The entity of claim 18, wherein the means for determining the location estimate for the UE comprises at least one of:
means for triangulating the location estimate based on the pair of AODs;
means for using at least one of the pair of AODs and a measured round trip time for the UE; or
means for obtaining a Reference Signal Time Difference for the pair of directed beams and obtaining the location estimate based on the Reference Signal Time Difference.

22. A non-transitory storage medium including program code stored thereon, the program code is operable to configure at least one processor in an entity for supporting location services for a user equipment (UE), comprising:
program code to obtain a differential Angle of Arrival (DAOA) for a pair of directed beams transmitted by at least one base station and received at the UE, wherein the DAOA is obtained from measurements of the pair of directed beams performed by the UE;
program code to obtain a differential Angle of Departure (DAOD) for the pair of directed beams transmitted by the at least one base station;
program code to compare the DAOA to the DAOD to determine if each directed beam in the pair of directed beams is Line Of Sight (LOS) between the at least one base station and the UE; and
program code to determine a location estimate for the UE using at least one of the directed beams in the pair of directed beams when each directed beam in the pair of directed beams is LOS.

23. The non-transitory storage medium of claim 22, wherein the pair of directed beams are from a single base station.

24. The non-transitory storage medium of claim 22, wherein the pair of directed beams are from two different base stations.

25. The non-transitory storage medium of claim 22, wherein the program code to obtain the DAOD comprises program code to obtain a pair of angles of departure (AODs) for the pair of directed beams.

26. The non-transitory storage medium of claim 25, wherein the entity is the UE, wherein the program code to obtain the DAOA comprises program code to measure the DAOA, wherein the program code to obtain the pair of AODs comprises program code to receive the pair of AODs from a location server in a point to point message or from a base station in a broadcast message.

27. The non-transitory storage medium of claim 25, wherein the entity is a location server, wherein the program code to obtain the DAOA comprises program code to receive the DAOA from the UE, wherein the program code to obtain the pair of AODs comprises program code to obtain the pair of AODs from a local database or receiving the pair of AODs from the at least one base station.

28. The non-transitory storage medium of claim 25, wherein the program code to determine the location estimate for the UE comprises at least one of:
program code to triangulate the location estimate based on the pair of AODs;
program code to use at least one of the pair of AODs and a measured round trip time for the UE; or
program code to obtain a Reference Signal Time Difference for the pair of directed beams and obtaining the location estimate based on the Reference Signal Time Difference.

* * * * *